United States Patent
Langhans (10) Patent No.: US 7,028,596 B1
(45) Date of Patent: Apr. 18, 2006

(54) ROTARY CUTTING UNIT

(75) Inventor: René Langhans, Speicher (CH)

(73) Assignee: Elpatronic AG, Bergdietikon (CH)

( * ) Notice: Subject to any disclaimer, the term of this patent is extended or adjusted under 35 U.S.C. 154(b) by 0 days.

(21) Appl. No.: 08/883,685

(22) Filed: Jun. 27, 1997

Related U.S. Application Data (63) Continuation of application No. 08/612,212, filed on Mar. 6, 1996, now abandoned, which is a continuation-in-part of application No. 08/182,074, filed on Jan. 13, 1994, now abandoned.

(51) Int. Cl.
*B26D 1/24* (2006.01)
*B26D 7/26* (2006.01)

(52) U.S. Cl. .............. 83/503; 83/492; 83/498; 83/507; 83/698.61

(58) Field of Classification Search ............ 83/503, 83/500, 498, 507, 508.3, 496, 497, 492, 499, 83/698.61
See application file for complete search history.

(56) References Cited

U.S. PATENT DOCUMENTS

| 679,566 A | 7/1901 | Kling ................ 83/492 |
| 1,951,529 A | 3/1934 | Possnet ............. 164/70 |
| 2,187,211 A | 1/1940 | McKinley ........... 164/60 |
| 3,364,803 A | 1/1968 | Senftleben ......... 83/503 |
| 3,459,086 A | 8/1969 | Reeder, Jr. ......... 83/425 |
| 3,956,957 A | 5/1976 | Corse ............... 83/482 |
| 4,428,265 A | 1/1984 | Bolton .............. 83/502 |
| 4,506,577 A | 3/1985 | Shinomiya et al. .... 83/499 |
| 4,604,934 A | 8/1986 | Elliott et al. ...... 83/880 |
| 4,676,133 A | 6/1987 | Fujimura ........... 83/497 |
| 5,007,318 A * | 4/1991 | Cox et al. ......... 83/500 X |

FOREIGN PATENT DOCUMENTS

| DE | 2718777 | 11/1997 |
| FR | 794676 | 2/1936 |
| FR | 2260523 | 9/1975 |
| FR | 2344364 | 10/1977 |
| FR | 2349416 | 11/1977 |
| FR | 2 349 416 | 11/1977 |
| GB | 892215 | 3/1962 |

* cited by examiner

*Primary Examiner*—Charles Goodman
(74) *Attorney, Agent, or Firm*—McCormick, Paulding & Huber LLP (57) ABSTRACT

A circular-cutter unit for equipment cutting flat lengths of material and sheet metal in a horizontal plane has upper and a lower circular blades both in planes perpendicular to the horizontal plane and in a longitudinal direction, carried by an upper and lower blade shaft, respectively, which are parallel with the horizontal plane and perpendicular to the longitudinal direction. The two blade shafts are rigidly and rotatably mounted in a common frame. The frame is U-shaped with the upper and lower legs connected by a flat yoke intersecting the horizontal plane at an acute angle. Several cutter units are mounted in a single apparatus and driven by a common drive from which the units can be individually detached for servicing.

16 Claims, 6 Drawing Sheets

ROTARY CUTTING UNIT

CROSS-REFERENCE TO RELATED APPLICATION

This application is a continuation of Ser. No. 08/612,212 filed Mar. 6, 1996, now abandoned, which is a continuation-in-part of application Ser. No. 08/182,074 filed Jan. 13, 1994 and now abandoned.

FIELD OF THE INVENTION

This invention relates to a circular cutting unit to cut flat lengths of materials, particularly sheet metals and especially to equipment to cut flat lengths of material using several such cutting units.

BACKGROUND OF THE INVENTION

Equipment of this general type is used in particular to cut sheet metal, for instance in the can manufacturing industry, although it can also be used for cutting paper and cardboard. Cutting can bodies requires extreme accuracy and cleanliness while keeping constant high outputs.

French patent document 612,303 (Marinori) discloses a paper-cutting machine with two shafts mounted in a fixed frame, individual circular blades being displaceably affixed to the shafts.

French patent document 2,340,170 (Metal Box Ltd) describes a sheet metal cutter with a series of circular blades displaceably mounted on two separate shafts.

The two above mentioned apparatuses of the state of the art share the design of mounting the circular blades on two mutually parallel and long shafts, the adjustment of the cutting width being implemented by axially displacing the individual circular blades. It follows that each of the cooperating pairs of circular blades must be individually adjusted on the upper and on the lower shafts and then be aligned again. Obviously such a procedure is both complex and time-consuming and, moreover, may lead to inaccuracies while there always is the danger of damage to the blades. As a rule the individual circular blades are adjusted in a hydraulic manner on the long shaft using suitable oil lines. As a result, the cutting apparatus and hence the material being cut is contaminated with oil, and this feature is highly disadvantageous when making cans.

Another drawback of equipment of the state of the art is the large size of the cutting-disk shafts which is required. In order to deliver the high pressure necessary for cutting sheet metal and because of the consequent danger of bending, especially at the center of the shaft, such a shaft must have a substantial diameter. Typically, shafts 105 mm in diameter are required to cut sheet metal. Hence, such shafts are expensive and furthermore sensitive to thermal expansion. Because the shaft diameters are large, the blade diameters also must be large, and as a result the blades evince an unfavorable, fairly shallow angle of cutting and hence generate untidy cut edges.

SUMMARY OF THE INVENTION

An object of the present invention is to provide a circular-cutter unit for equipment cutting flat lengths of material and sheet metal, where said equipment is simple, compact, economical and low-soiling, and which is transversely displaceable as a whole so that mutual adjustment of the cooperating pair of circular blades no longer is required.

Briefly described, the invention comprises a circular cutter unit for equipment for cutting flat lengths of material, especially sheet metal, lying in a horizontal plane and having a longitudinal direction. The cutter unit includes upper and lower circular blades both of which lie in planes perpendicular to the horizontal and parallel with the longitudinal direction. The two blades are supported by upper and lower blade shafts, respectively, which are parallel with the horizontal plane and perpendicular to the longitudinal direction, both blade shafts being rotatably and rigidly affixed in a common frame having substantially a U-shape with upper and lower legs connected by a flat yoke intersecting the horizontal plane at an acute angle. The cutter unit is releasably coupled to a driving unit having a motor, a drive for one of the blades being connected to the motor of the driving unit and the other blade being non-positively driven by the drive for the first blade.

One advantage achieved by the invention is that the circular blades are easier to handle because the cutting gap between the two circular blades needs to be set only once for the full-service life.

Another advantage is that opportunity for damage to the cutting edges when adjusting or setting the circular blades is reduced because the cutting gap needs to be set only once. There is no relative displacement in either direction of the circular blades or of the blade shafts, and the circular blades remain fixed in place during their entire service life.

A third advantage is that conversion time is greatly reduced because the time-consuming setting and monitoring of the cutting gap is eliminated. Instead of one blade, a pair of blades can be positioned in one step. No relative displacement in either direction of the circular blades or of the blade shafts is required, and the cutter units are adjustable in a fully automated manner.

Yet another advantage of the invention is the increased availability and increased production output of the cutting unit due to the reduced conversion time, rapid exchange of worn cutter units, simple dismantling of worn parts because the blade shafts are not continuous, and the possibility of exchanging the worn parts and grinding the circular blades outside the cutting equipment.

Still another advantage of the invention is the increased production output due to the cutting unit which is serviced more easily and quickly.

Another advantage of the present invention is realized by the non-interlocking upper blade drive in each circular cutting unit which allows easy and quick exchange of circular blades with minimal operational interruptions.

A further advantage of the present invention is a constant, burr-free cut-edge quality which is obtained by using a constant cutting gap, reduced overlap of the circular blades, and strongly reduced shearing surface.

A still further advantage of the present invention is realized by the cutting unit frame which carries the pressure between the two blades and thereby reduces shaft loads and allows a small shaft diameter and circular blade diameter. The result is a steeper cutting angle, lower forces, and a neater cut edge.

BRIEF DESCRIPTION OF THE DRAWINGS

The invention and further developments of this invention are elucidated below in relation to the partly schematic representations of several illustrative embodiments wherein.

DESCRIPTION OF THE PREFERRED EMBODIMENTS

The circular cutter unit of the invention shown in FIGS. 1 through 4 essentially comprises an upper circular blade 2 and a lower circular blade 4, both operating perpendicularly to the horizontal plane 10 and in the longitudinal direction 8, that is, in the plane and direction of advance of the flat length of material being introduced, for instance sheet metal for manufacturing cans.

The upper circular blade 2 is affixed to an upper blade shaft 1 and the lower circular blade 4 to a lower blade shaft 3 which both extend parallel with the horizontal plane 10 and with the transverse direction 7. The two blade shafts 1, 3 are shown in detail in FIG. 4 and are supported respectively in a play-free upper blade-shaft bearing 11 and an lower blade-shaft bearing 12. Upper blade-shaft bearing 11 is mounted in a longitudinally displaceable bush 13 to allow setting of the cutting gap which is advantageously set at 0.01 to 0.02 mm for can sheet metal.

The two blade shafts 1, 3 are mounted in a common and essentially U-shaped frame 5 at a fixed distance from one another. The upper leg 51 and the lower leg 52 of frame 5 are joined by a flat yoke 53 subtending an acute angle α of about 10° with the horizontal plane 10 (see FIG. 2), and can lie in a range of 8° to 12°, preferably 9° to 11°. The yoke 53 therefore is practically in the horizontal plane 10 and splits the already cut length of material into a right upper strip and a left lower strip relative to the direction of advance 8. Because blade shafts 1, 3 are short and free from substantial forces, yoke 53 may be made comparatively thin and, furthermore, a diameter of less than 25 mm and preferably less than 20 mm, or about 15 mm suffices for the blade shafts themselves.

Frame 5 includes means for displaceably supporting the frame in the form of two bushings 26 and 27 which are slideably mounted on two guide rails 6 extending parallel to the blade shafts 1, 3 so that the frame is displaceable in the transverse direction 7, as a result of which the circular cutter unit 14 is easily moved as a whole and is easily positioned relative to other circular cutter units 15 also mounted on the guide rails 6.

Conventional mechanical clamp means (not shown) may be used for a stop function for each of the circular cutter units on guide rails 6. The circular cutter units can be positioned on guide rails 6 in the transverse direction 7 perpendicular to the longitudinal direction 8 by an electromechanical system, the travel measurement for the various units preferably being integrated. Appropriately, the resolution should be about 0.01 mm and the accuracy of positioning about ±0.01 mm.

The feed means of the material to be cut, in particular flat lengths of materials and sheet metal, are not shown in the drawing but are known in the state of the art using conventional bench and strip insertion devices. The removal means (also not shown) of the cut materials is by conventional conveyor belts.

Circular cutter unit 14 is driven by a drive shaft 16 with an approximately square cross-section driving a gear 17 with a borehole 22 also of approximate square cross-section. Drive shaft 16 of all of the cutter units is driven by a drive unit 30 which includes an electric motor (not separately shown) or any other suitable drive means. Preferably, the drive unit is easily detachable from shaft 16 so that the cutter units can be individually removed from the system for adjustment and maintenance. This is an important feature because it permits the units to be individually serviced and replaced without shutting down the entire system. In sheet metal cutting apparatus, blade replacement is a common event, contrary to apparatus which is only used for cutting materials such as paper, and it is important that provision for removal of cutting units for the purpose of blade replacement be provided.

Gear 17 engages a gear 18. At the same time, gear 18 forms the attachment flange of the integral lower blade shaft 3 to which the lower circular blade 4 is laterally attached. Upper circular blade 2 is attachable in the same manner to flange 21 of the upper, integral blade shaft 1.

The upper circular blade 2 is indirectly driven by the motor-driven lower circular blade 4 through frictional engagement of transport rings 19 and 20, thus forming a non-positive drive. The upper and freely rotatable transport ring 20 is opposite the lower, motor-driven circular blade 4, whereas the lower motor-driven transport ring 19 is opposite the upper, freely rotatable circular blade 2.

The cutting gap between the two circular blades 2, 4 is created and adjusted by loosening tightening screws 24 clamping the thread flanks of a slotted nut 23 against the thread flanks of the displacement bush 13 and by subsequently rotating the displacement bush 13 using a pin wrench 25. Rotation of displacement bush 13 is converted by the pitch of the play-free fine thread between the rotating displacement bush 13 and the stationary, slotted nut 23 into an adjustment motion as a result of which the cutting gap can be accurately set. In the embodiment shown, a revolution of 360° corresponds to a thread pitch of 0.75 mm.

Once the cutting gap has been set, tightening screw 24 is re-tightened, so that the set position is clamped. A cutting gap between the two circular blades 2, 4 in the range of 0.005 to 0.030 mm, preferably between 0.01 and 0.02 mm was found appropriate.

The overlap of the two circular blades 2, 4 is appropriately adjusted permanently and in this embodiment it is 0.2 mm. Preferably the overlap is in the range of 0.18 to 0.23 mm.

Figure 1:
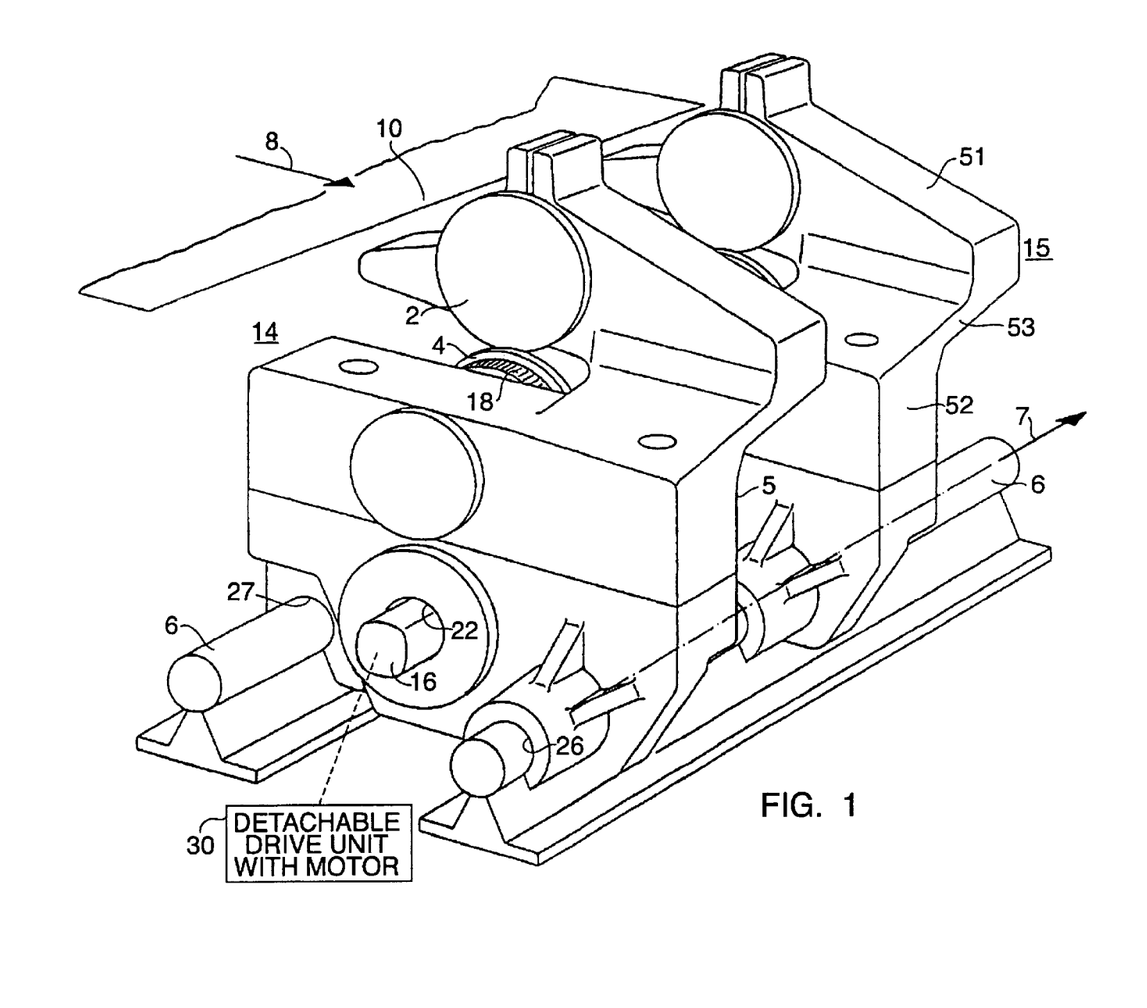
FIG. 1 is a perspective of the circular cutter unit of the invention.
Figure 2:
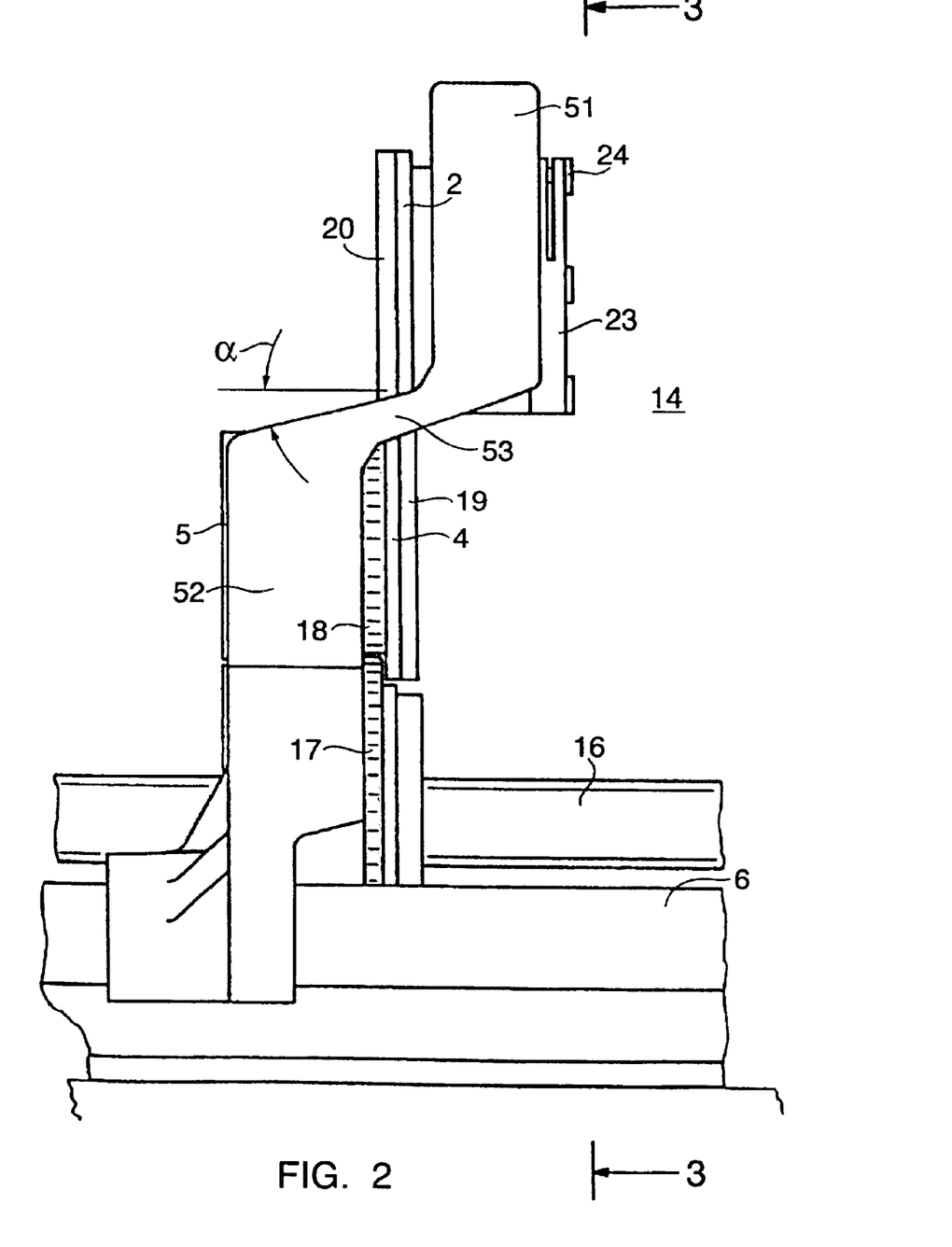
FIG. 2 is an elevation facing the direction of advance of the circular cutter unit of the invention.
Figure 3:
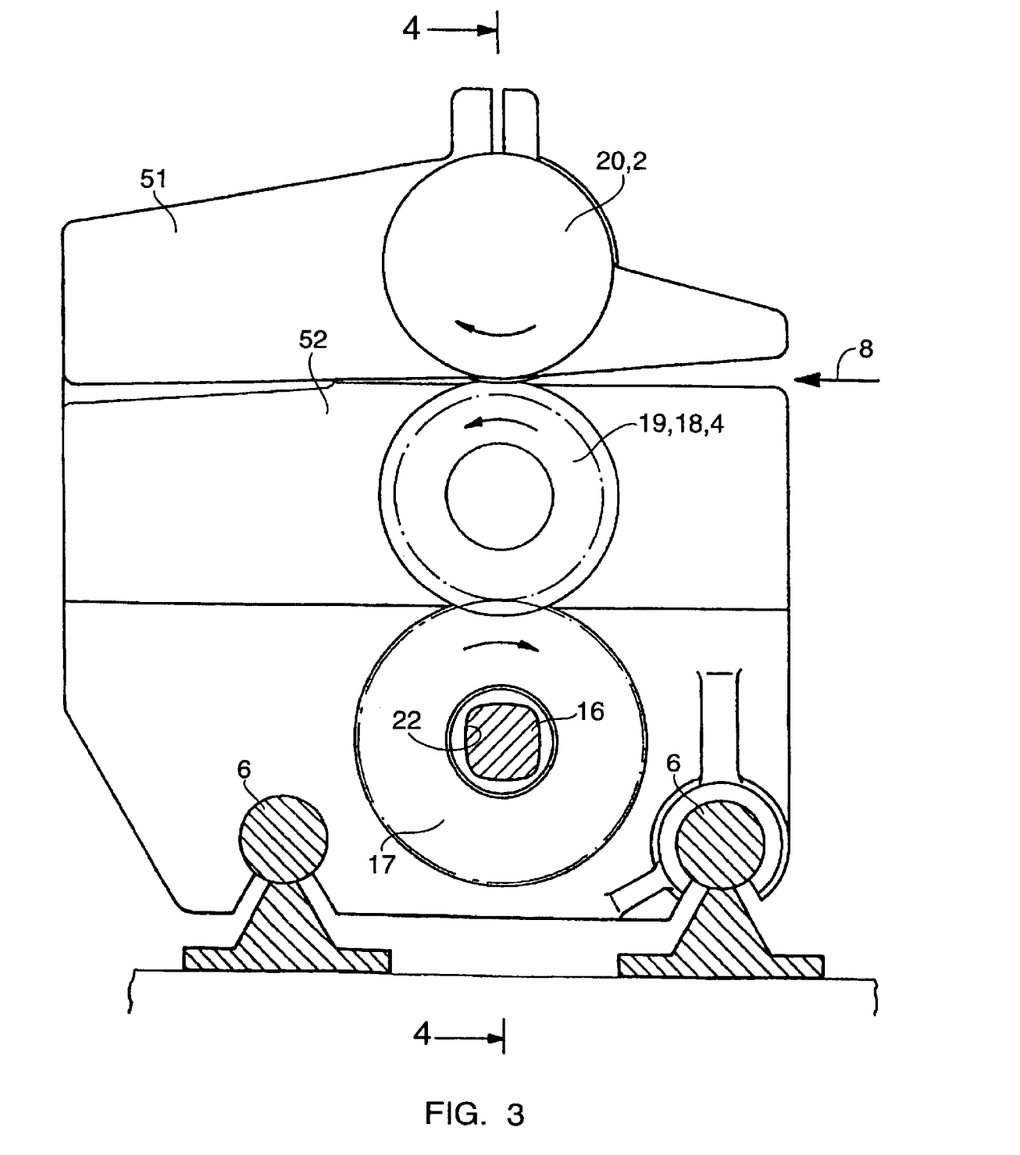
FIG. 3 is a cross-section along line III—III of FIG. 2.
Figure 4:
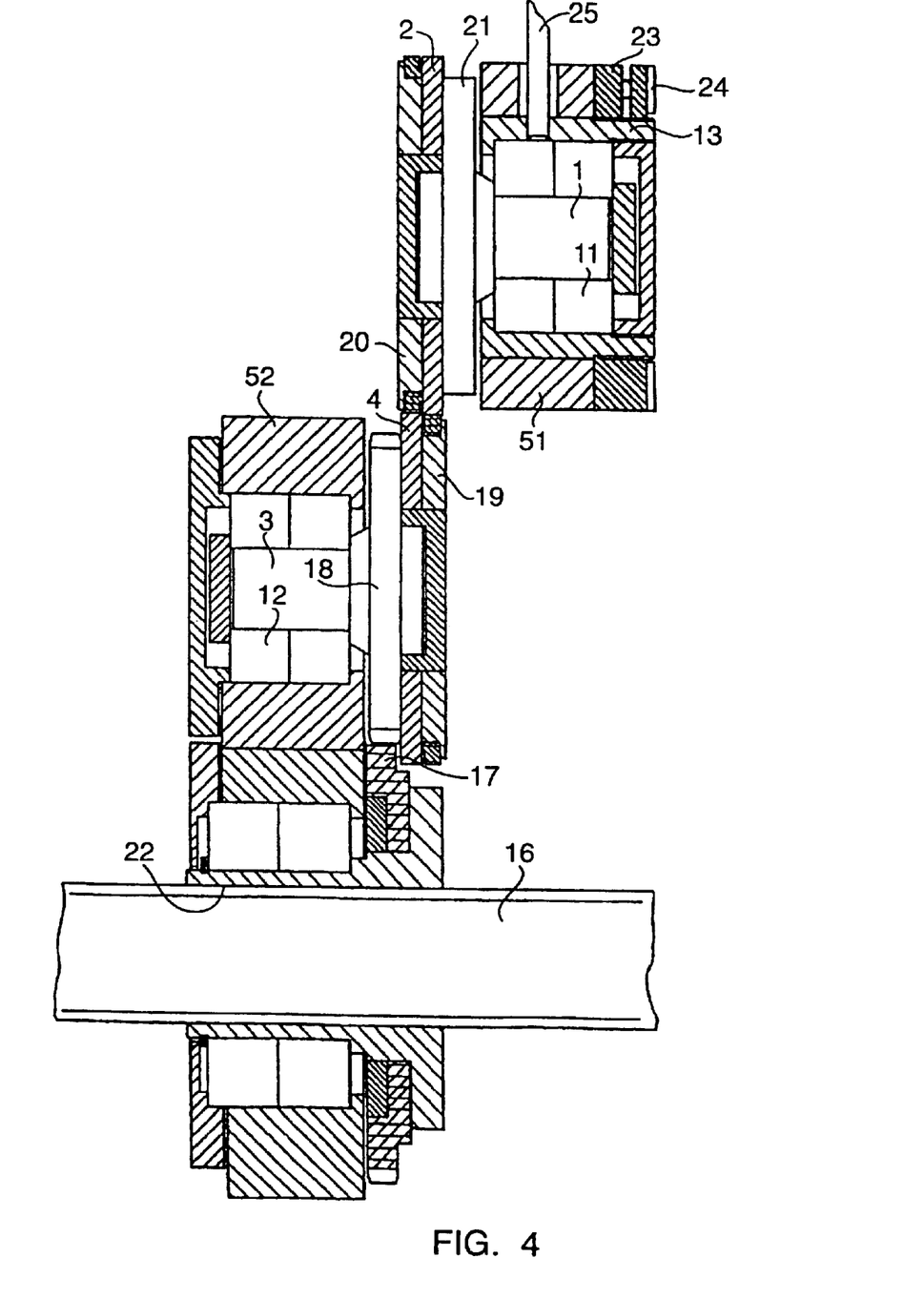
FIG. 4 is a cross-section along line IV—IV of FIG. 3.
Figure 5:
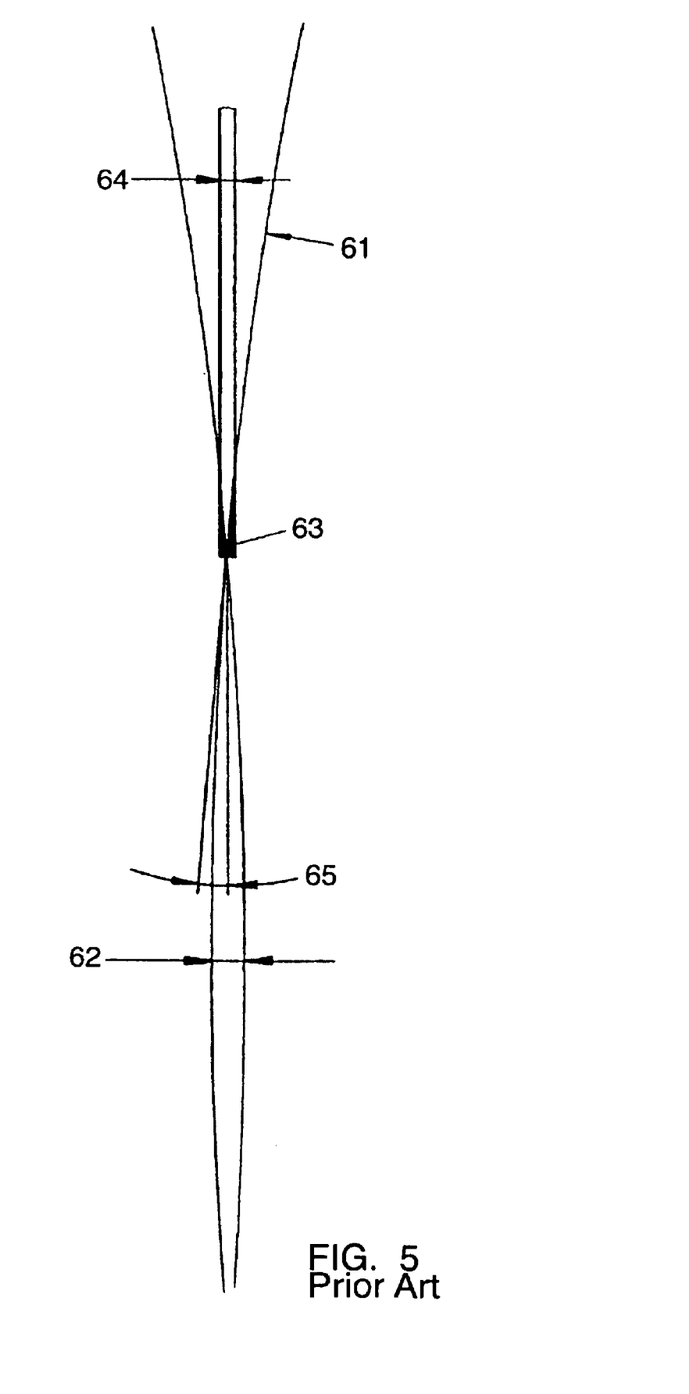
FIG. 5 is a schematic of the shearing procedure in a cutter system of the state of the art.
Figure 6:
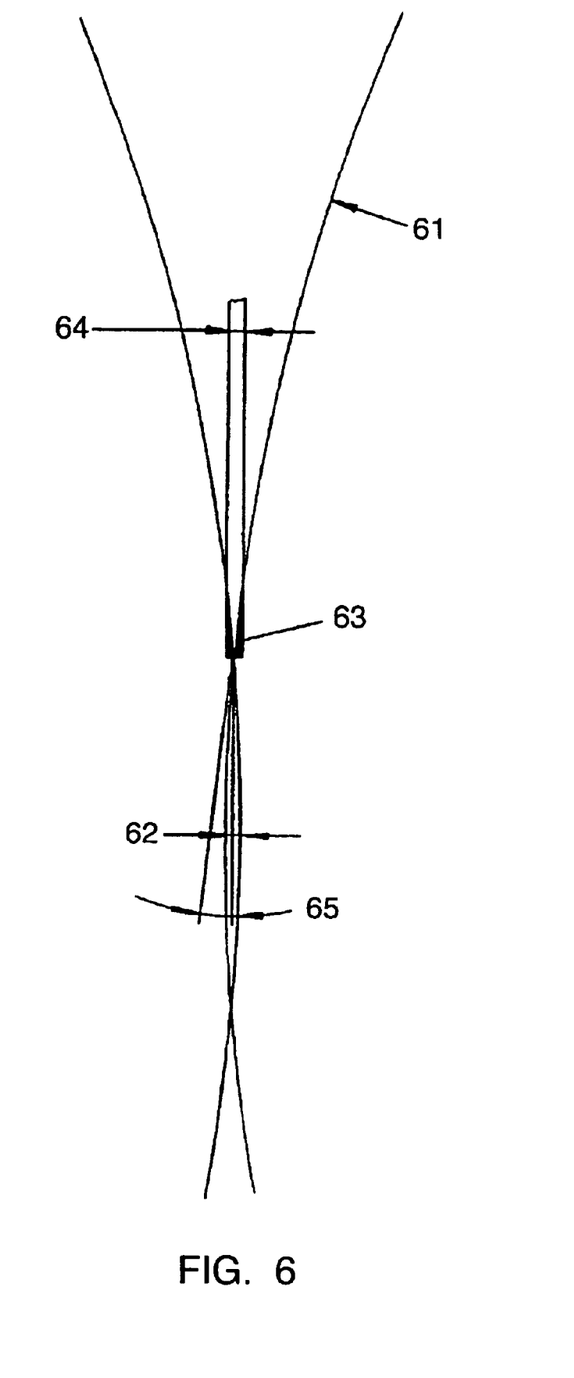
FIG. 6 is a schematic of the shearing procedure of the circular cutter unit of the invention.

FIGS. 5 and 6 schematically compare the shearing procedures in one case for the cutter unit of the state of the art and in the other case for the invention. The relevant shearing parameters compare as follows.

| Parameter | FIG. 5 (Prior Art) | FIG. 6 (Invention) |
| --- | --- | --- |
| circular blade diameter 61 | 100% | 41% |
| overlap 62 | 100% | 40% |
| shearing surface 63 | 100% | 61% |
| cutting time | 100% | 60% |
| sheet metal thickness 64 | 0.25 mm | 0.25 mm |
| cutting angle 65 | 5° | 7° |

The comparison in percent clearly shows the reductions regarding overlap, shearing surface and cutting time as well as the enlargement of the cutting angle to a range of 6° to 8° at the nib of the overlap, preferably in the range of 6.5° to 7.5° which can be achieved using the circular-cutter unit of the invention, which are the reasons for the much improved quality of the cut edges.

What is claimed is:

1. A circular cutter unit for cutting lengths of flat material comprising:
   upper and lower circular blades lying in planes substantially perpendicular to a plane defined by the flat material and parallel with a longitudinal direction of the flat material;
   upper and lower blade shafts respectively supporting said upper and lower circular blades, said shafts extending parallel with said plane of the material and perpendicular to said longitudinal direction;
   a non-positive drive connection between said circular blades including a transport ring mounted for rotation with the blade on one of the blade shafts and in driving relationship with the blade on the other of the blade shafts;
   a frame having substantially a U-shape when viewed in a direction perpendicular to the plane of the flat material with upper and lower legs interconnected by a flat yoke intersecting said plane of the flat material at an acute angle,
   means for rotatably supporting said upper and lower blade shafts respectively in said upper and lower legs; and
   means for establishing and adjusting a cutting gap between said two circular blades.

2. A circular cutter unit according to claim 1 wherein said cutting gap is adjusted to between about 0.005 mm and about 0.030 mm.

3. A circular cutter unit according to claim 1 wherein the transport ring of said non-positive drive connection between said blade shafts is in frictional driving engagement with the other of the blades.

4. A circular cutter unit according to claim 1 wherein the means for establishing and adjusting a cutting gap between said two circular blades includes an axially displaceable bush mounted in said upper leg of said frame.

5. A circular cutter unit according to claim 1 wherein said cutting gap between said two circular blades is adjusted to a range of about 0.01 mm to about 0.020 mm.

6. A circular cutter unit according to claim 1 wherein said upper and lower blade shafts support said circular blades in overlapping relationship at a cutting angle in a range of about 6° to about 8° at a nib of the overlapping circular blades.

7. A circular cutter unit according to claim 6 wherein each of said blade shafts has a diameter of less than about 25 mm.

8. A circular cutter unit according to claim 7 wherein said acute angle at which said flat yoke intersects said plane of the flat material is in a range of about 8° to about 12°.

9. A circular cutter unit according to claim 1 wherein said circular blades have cutting edges overlapping radially by a distance in a range of about 0.18 mm to about 0.23 mm.

10. A circular cutter unit according to claim 9 wherein said upper and lower blade shafts support said circular blades at a cutting angle in a range of about 6.5° to about 7.5°.

11. A circular cutter unit according to claim 10 wherein each of said blade shafts has a diameter of less than about 20 mm.

12. A circular cutter unit according to claim 11 wherein said acute angle at which said flat yoke intersects said plane of the flat material is in a range of about 9° to about 11°.

13. An apparatus for cutting flat lengths of sheet metal in a generally horizontal plane comprising:
   a plurality of circular cutting units each including:
      upper and lower circular blades lying in planes substantially perpendicular to the horizontal plane and parallel with a longitudinal direction in which the sheet metal is fed between the circular blades,
      upper and lower blade shafts respectively supporting said upper and lower circular blades, said shafts extending parallel with said horizontal plane and perpendicular to said longitudinal direction,
      a frictional drive connection between said blade shafts including a transport ring mounted respectively on each one of the upper and lower blade shafts adjacent the upper and lower circular blades respectively, and disposed in frictional driving relationship with the circular blade on the other of the upper and lower blade shafts;
      a frame having substantially a U-shape when viewed from above the horizontal plane with upper and lower legs interconnected by a flat yoke intersecting said horizontal plane at an acute angle, and
      means for rotatably supporting said upper and lower blade shafts respectively in said upper and lower legs, and means for establishing and adjusting a cutting gap between said two circular blades;
   said apparatus further comprising a plurality of parallel guide rails extending perpendicular to said longitudinal direction in which the sheet metal is fed between the circular blades; and wherein
   said frame of each of said circular cutter units is slideably mounted on said guide rails so that each of said circular cutter units is independently positionable along said guide rails.

14. An apparatus according to claim 13 wherein at least one of said circular cutting units has a cutting gap between said upper and lower circular blades in a range of about 0.0005 mm to about 0.030 mm.

15. An apparatus according to claim 13 wherein said circular cutting units are mounted on said guide rails with said circular blades of each circular cutting unit oriented in parallel relationship with the circular blades of the other circular cutting units.

16. An apparatus according to claim 13 further comprising a drive unit including a motor for driving said lower blade shaft.

* * * * *

UNITED STATES PATENT AND TRADEMARK OFFICE
CERTIFICATE OF CORRECTION

PATENT NO. : 7,028,596 B1 Page 1 of 1
APPLICATION NO. : 08/883685
DATED : April 18, 2006
INVENTOR(S) : Langhans It is certified that error appears in the above-identified patent and that said Letters Patent is hereby corrected as shown below:

Column 6,
Line 48, delete "0.0005" and replace with -- 0.005 --.

Signed and Sealed this

Fourth Day of July, 2006

JON W. DUDAS
*Director of the United States Patent and Trademark Office*